E. T. SHORTT.
COFFEE ROASTER.
APPLICATION FILED AUG. 1, 1913.
1,122,651.
Patented Dec. 29, 1914.
3 SHEETS—SHEET 1.
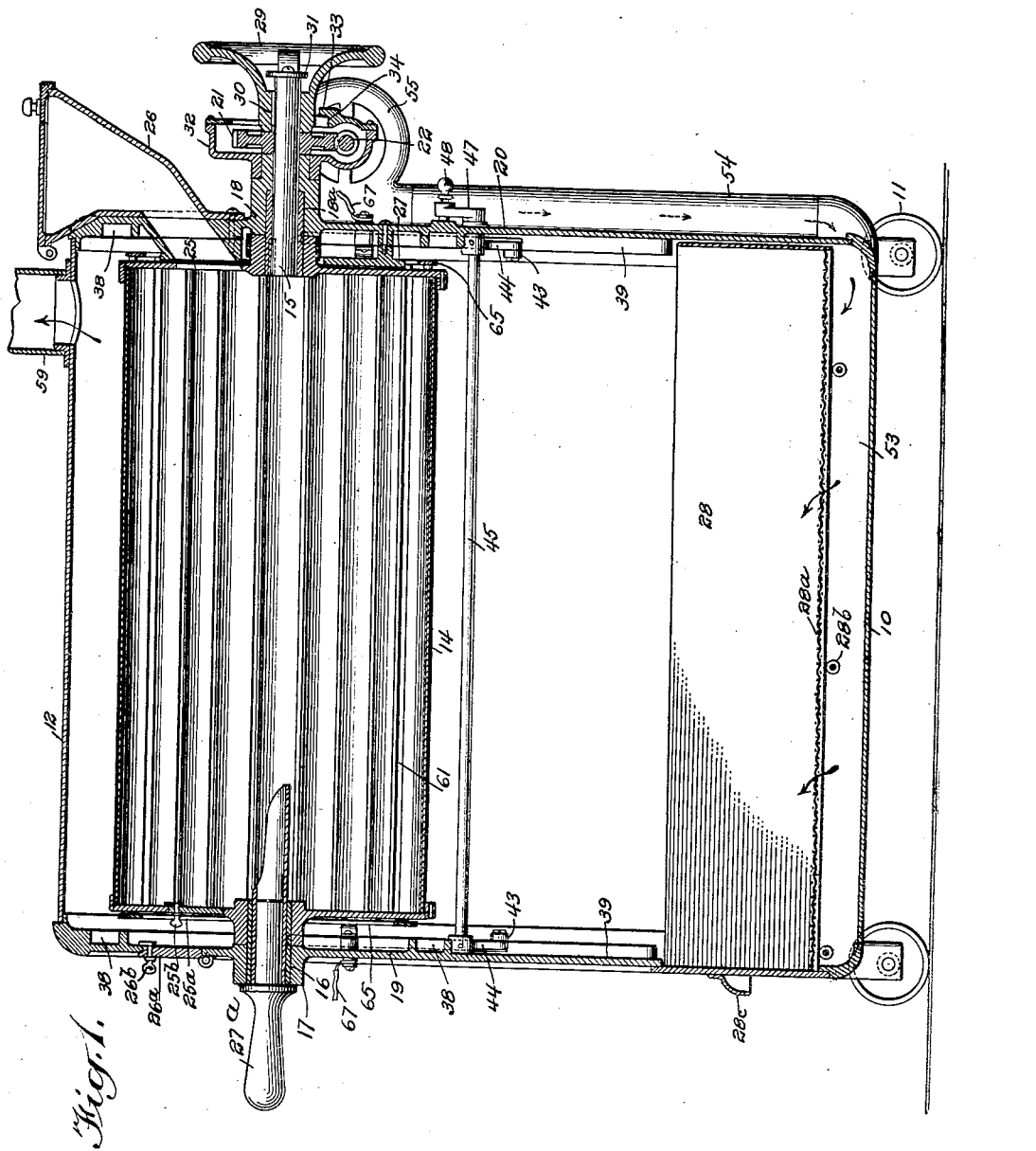
WITNESSES
INVENTOR
EVERETT T. SHORTT
BY
ATTORNEYS

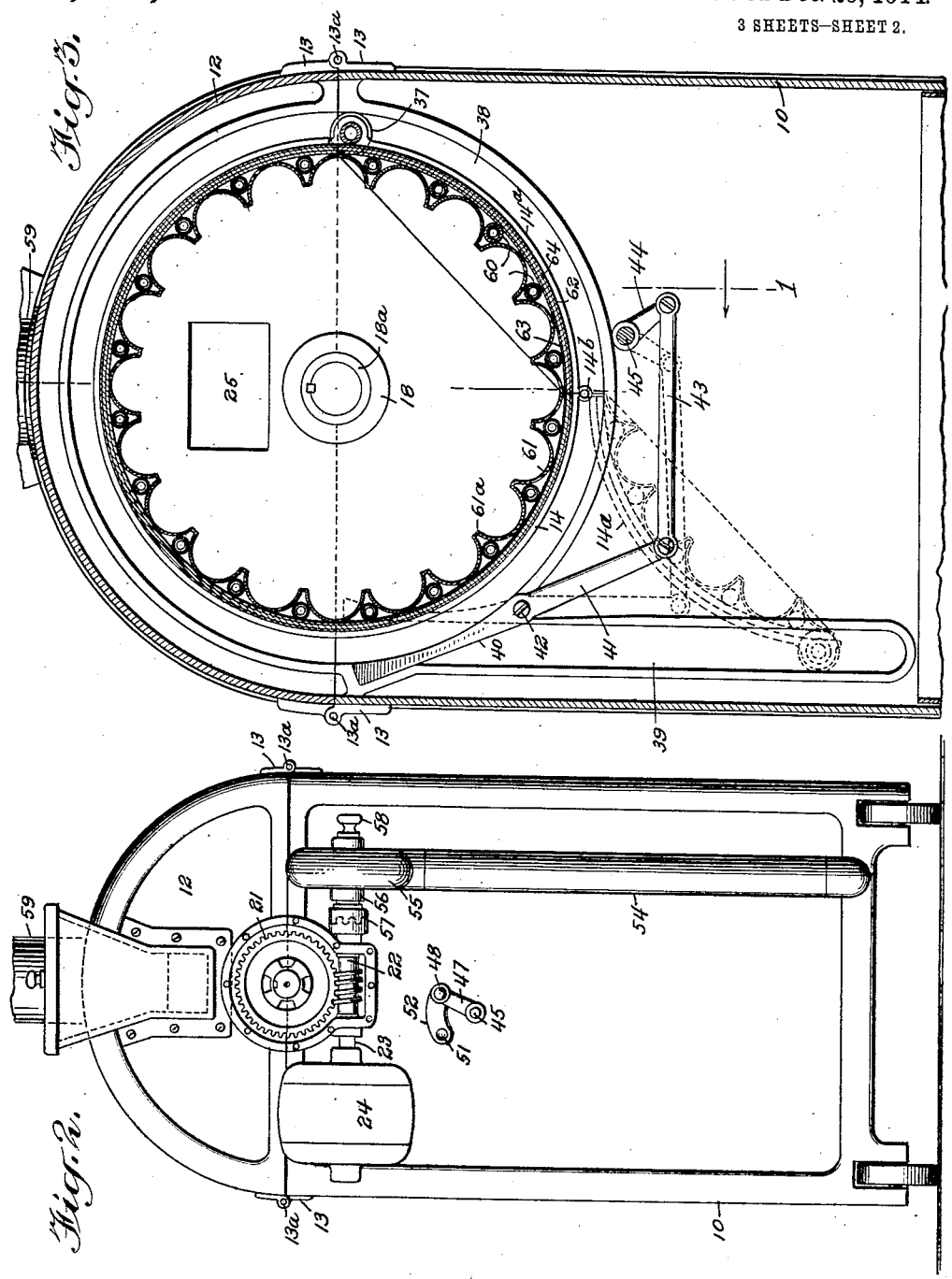

E. T. SHORTT.
COFFEE ROASTER.
APPLICATION FILED AUG. 1, 1913.
1,122,651.
Patented Dec. 29, 1914.
3 SHEETS—SHEET 3.
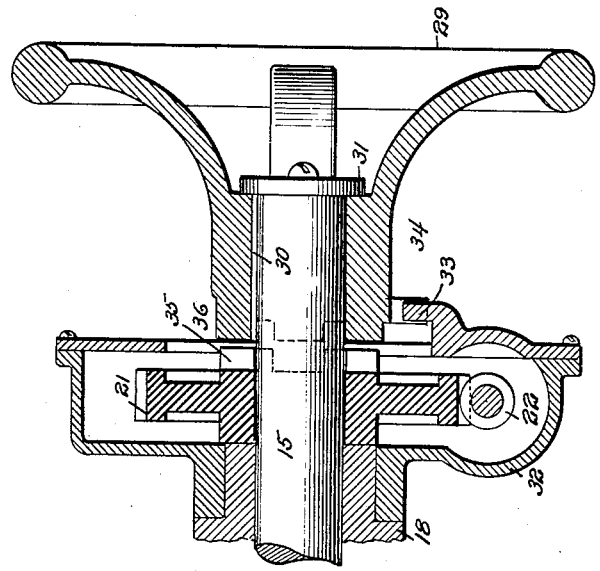
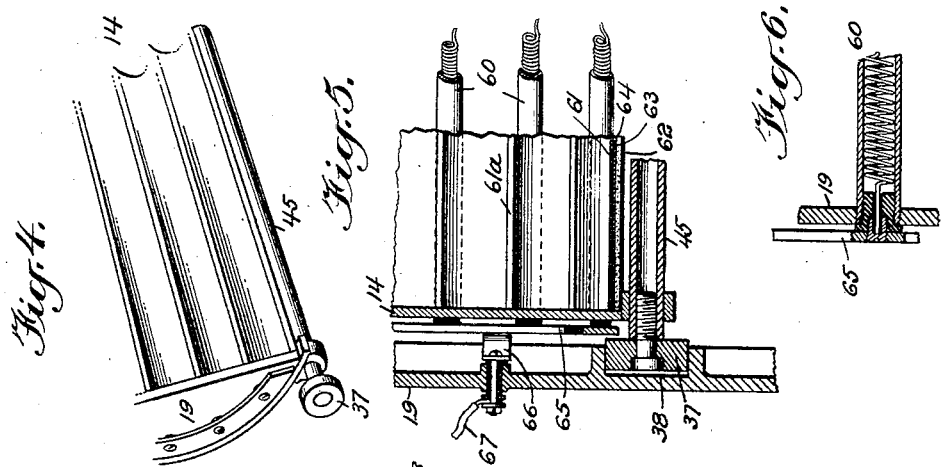
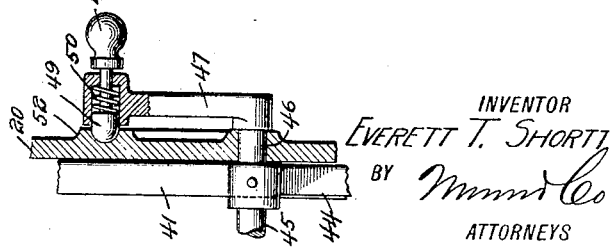
WITNESSES
INVENTOR
EVERETT T. SHORTT
BY
ATTORNEYS

UNITED STATES PATENT OFFICE.

EVERETT T. SHORTT, OF SAN DIEGO, CALIFORNIA.

COFFEE-ROASTER.

1,122,651.   Specification of Letters Patent.   Patented Dec. 29, 1914.

Application filed August 1, 1913. Serial No. 782,431.

*To all whom it may concern:*

Be it known that I, EVERETT T. SHORTT, a citizen of the United States, and a resident of San Diego, in the county of San Diego and State of California, have invented a new and Improved Coffee-Roaster, of which the following is a full, clear, and exact specification.

My invention relates to roasting apparatus having a rotary drum, and is more particularly intended for the roasting of coffee beans.

It is a design of my invention to provide a self-contained drum and heating elements, instead of heating the drum by adventitious heating means.

It is a further design of my invention to provide heating means in connection with the drum, of a character to do away with all fumes and noxious products resulting from ordinary heating means, and which are liable to contaminate the coffee or other material being roasted.

It is also a design of my invention to provide a drum having heating elements disposed around the same and rotating therewith, and correlated members on the interior of the drum so arranged as to uniformly roast the coffee or other material.

The invention also has for its design to provide a novel means manually controlled, for bringing the drum to a dumping position, and for causing the closure of the drum to be opened and closed by the turning of the drum.

It is furthermore a design of the invention to provide a novel means for cooling the dumped, roasted coffee, and ejecting the fumes from the coffee.

It is furthermore a design of my invention to improve in various particulars, roasters of the general character indicated, to the end that efficiency in operation may be promoted, as well as simplicity of adjustment and control.

The distinguishing features of my invention, and the important structural elements characterizing the practical embodiment which is illustrated as an example, will be more particularly explained in the specific description following.

Reference is to be had to the accompanying drawings forming a part of this specification, in which similar characters of reference indicate corresponding parts in all the views.

Figure 1 is a longitudinal vertical section of a roaster embodying my invention on line 1—1 of Fig. 3; Fig. 2 is an end view thereof, parts being omitted to show the drive; Fig. 3 is a transverse section of the upper portion of the roaster on a larger scale; Fig. 4 is a fragmentary perspective view showing a portion of the closure for closing the drum and a member carried thereby, to be tripped for operating said closure; Fig. 5 is a fragmentary sectional view taken at one end of the drum, showing the parts illustrated in Fig. 4, and a portion of the electric heating elements; Fig. 6 is a fragmentary sectional view of a portion of one of the electric heating elements and a collecting ring with which said elements are in electrical connection; Fig. 7 is a fragmentary longitudinal vertical section of a drive and manually controlled means on the drum trunnion to give reverse turning movements to the drum to bring the same to and from a dumping position; and Fig. 8 is a detail fragmentary view, partly in section, of a trip-operating means for tripping the drum closure.

In constructing the particular embodiment of my invention in accordance with the illustrated example, a suitable casing 10 is provided, which may have running wheels 11. A cover 12 is provided for the upper end of the casing, and preferably mating hinge members 13 are provided at both sides of the cover and casing respectively, the hinge sections being adapted to receive pins 13ª, so that either pin may be withdrawn, leaving the other to constitute a hinge pin. Within the casing is mounted a horizontal drum 14 provided with journals shown at one end of the drum in the form of a solid trunnion 15, and at the opposite end in the form of a hollow trunnion 16, a bearing 17 of the trunnion 16 being formed on one head 19 of the casing and a bearing 18 for the other trunnion 15 being formed on the opposite head or end 20 of the casing. There may be a sleeve 18ª keyed on the trunnion 15 if desired.

A drive wheel, preferably a worm wheel 21, is loose on the trunnion 15, a worm 22 in mesh with said wheel being provided on a drive shaft 23, which preferably is driven by an electric motor 24. A clutch means hereinafter referred to effects driving connection between the worm wheel and a member turning with the drum 15.

Suitable provision is made for charging the cylinder with coffee, for which purpose I have shown a charging opening 25 at one end of the drum which, when brought in register with a hopper 26, will afford entrance for the coffee. If desired, also, there may at the opposite end be a door 25ª provided on the cylinder, and a door 26ª on the head 19, so that the opening of said doors by means of the knobs 25ᵇ, 26ᵇ, will afford access to the cylinder. In order that coffee may not escape from the opening 25, as the latter is turned downward away from the hopper 26, a ring 27 is provided on the head 20 adjacent to the cylinder end, said ring being broken at the hopper 26, but otherwise being continuous. The trunnion 16 affords entrance for a testing scoop 27ª. The roasted coffee is adapted to be dumped from the cylinder into a receptacle 28, preferably in the form of a drawer having an openwork bottom 28ª and mounted on rollers 28ᵇ, to be readily slid out of and into the casing by means of the handle 28ᶜ. To turn the cylinder to and from a dumping position, and to effect the operation of the closure 14ª, which constitutes a quarter section of the cylinder, the following means are provided: On the trunnion 15 there is mounted a hand-wheel 29, or its equivalent, which is secured by a key 30 which causes the wheel and trunnion to turn in unison, but permits a sliding movement of the wheel, there being a stop 31, in the form of a washer or the like to arrest the outward movement of the wheel. On the casing 32 of the worm gear 21, 22, a stop 33 projects inward radially in the direction of the trunnion 15, and on the wheel 29 a corresponding projection 34 is formed and projects radially outward, the sliding of the wheel serving to bring the said projection 34 into position to be engaged by the projection 33 when the hand wheel has turned the drum 14 to a dumping position.

I provide means for connecting and disconnecting the drum and its drive wheel 21, use being made for the purpose of clutch elements formed respectively on the said drive wheel and on the hand wheel 29 as a convenient appurtenance of the drum 14 and turning with the latter. The clutch elements are designated 35 and 36 respectively. The arrangement is such that the outward sliding of the hand-wheel 29 as part of the drum, disconnects the clutch elements and permits the rotation of the drum independently of its worm gear, by means of its hand wheel 29, the rotation being limited by the projections 33, 34. The described drive and clutch, it is to be understood, are illustrated as one example of a practical means for making and breaking the driving connection with the drum.

The closure 14ª of the drum is hinged as at 14ᵇ, and at its opposite end it carries a member or members to be engaged by a manually controlled trip when it is desired to dump the contents of the drum through the medium of the hand-wheel 29. The said members on the closure 14ª may consist of rollers 37 on the ends of said closure, each roller normally traveling in a circular track 38 on the adjacent drum end. A branch track 39 or guideway extends from the circular track 38 and is preferably tangential thereto, or approximately so, being in the arrangement shown, extended downward at one side of the casing, as best seen in Fig. 3.

A trip 40 constitutes a deflecting arm, said trip being formed on a lever 41, fulcrumed as at 42, the levers at each end of the casing being connected by links 43 with arms 44 on a rock shaft 45, which extends lengthwise beneath the drum. The shaft 45 has an operating handle 47 outside of the end 20 of the casing, conveniently located below the hand-wheel 29, as best seen in Fig. 8, and said handle is provided with a knob 48, the sliding spindle 49 of which projects at its inner end beyond the handle under the influence of a helical spring 50 housed within the handle, the spring serving to yieldingly engage the inner end of the spindle with either of two depressions 51 in a member 52, which is integral with or secured to the head 20, the arrangement serving to retain the handle 47 in a given position and thus determine the position of the deflecting trip 40 through the medium of the described connections. By the arrangement shown it will be obvious that the handle 47 may be thrown to rock the arm 40 laterally, so that it may close the entrance to the branch track 39, and form a continuation of the circular track 40ª, as clearly shown in Fig. 3. The handle 47 may be thrown in the opposite direction to rock the arm 40 to the position shown in dotted lines Fig. 3, leaving the branch track 39 open and forming a closure of the circular track. It will now be evident that when the hand wheel 29 is moved outward to break the clutch connection between the drum and the drive wheel 21, the drum may be given a partial turn by reason of said hand wheel. The turning of the drum to the left, referring to Fig. 3, with the deflecting trip in the dotted position, will cause each roller 37 to take its respective branch track 39, so that the advancing movement of the drum will cause the closure 14ª to assume the open position indicated in dotted lines, Fig. 3, the turning of the drum by the hand wheel being limited by the stops 33, 34, as described, in order to properly position the open portion of the drum above the receiver 28, and also to prevent undue movement of the drum and cover. It will be obvious that a reverse movement of the hand wheel 29 will cause the closure 14ª to close, whereupon the arm 47 of the shaft 45 may be so moved as to return the deflecting trip 40 to the normal position, and require the rollers 37 to follow the circular track and maintain the drum in closed position, it being understood that to again drive the drum, the hand-wheel is moved inward to effect the engagement of the clutches.

To cool the dumped coffee and discharge the steam, etc., from the coffee, the receiver 28 is supported above the bottom of the casing 10, providing an air chamber 53, communicating with which is a down-take discharge pipe 54 from a fan blower 55, which is mounted on a sleeve or sliding section 56 of the drive shaft 25. Any approved clutch 57 may be provided to be connected and disconnected by an axial movement of the knob 58 on the sleeve 56 on which the fan is mounted, whereby to bring the fan into operation or disconnect the same as desired. The fumes, steam, etc., from the coffee pass out through an exhaust pipe 59 provided in the top of the cover 12, (see Fig. 1).

To heat the drum I provide electrical heating elements 60 disposed lengthwise in the drum, at intervals around the same, these elements being disposed between an inner lining 61 and an outer drum casing composed preferably of an outer layer 62, which may be of sheet metal; a similar inner layer 63 and an interposed layer 64 of asbestos or other heat insulating material, Figs. 3 and 5. The lining 61 is corrugated to produce parallel hollow ribs 61ª and intervening corrugations, and the heating elements 60 are located within and range longitudinally of the said ribs, between the same and the outer heat insulating casing. The arrangement provides an effective heating of the ribs and the latter serve to prevent massing of the coffee beans, the result being that a uniform roasting of the coffee is effected. Moreover it will be apparent that a more sanitary roasting of the coffee results by doing away with heating means that give out noxious gases or contaminating products. Furthermore, the provision of a self-contained heater and drum, with the heating elements rotating with the drum, allows the heating elements to be so distributed around the drum as to give the desired uniformity in the distribution of the heat. Also simplicity and cleanliness are very greatly promoted. The current is supplied to the heating elements 60 in any approved manner, use being made in the construction shown, of collecting rings 65 with which said elements are connected at the ends of the cylinder, brushes 66 being provided on the ends of the casing having suitable connection with conductor wires 67.

Having thus described my invention, I claim as new and desire to secure by Letters Patent:

1. In a roasting apparatus, a revoluble drum having a discharge opening, a hinged closure on said drum, commanding said opening, and manually-controlled means movable to and from a position for causing said closure to swing on its hinge by the rotation of the said drum.

2. In an apparatus of the kind described, a rotary drum having a discharge opening, a hinged closure on said drum, commanding said opening, and a trip movable to a position to engage the closure without interfering with the rotation of the body of the drum, to cause a movement of the closure on its hinge by the relative rotation of the drum body.

3. In an apparatus of the kind described, a revoluble drum having a discharge opening, a hinged closure having a member traveling in a circular path when the drum is closed, a deflecting track, and means for directing said member to the latter track to cause the rotation of the drum to move the closure on its hinge.

4. In an apparatus of the kind described, a rotary drum having a discharge opening, a closure for said opening, a stationary circular track, said closure having a member traveling in the track to maintain the closure in the closed position, a deflecting track branching from the circular track, and means at the juncture of the circular and branch tracks to direct the said member to the branch track, or past said track.

5. In an apparatus of the kind described, a rotary drum, drive means for said drum, manually controlled means on the drum to turn the same independently of the drive, and clutch elements on the drive and on said manually controlled means, said manually controlled means being operable to turn the drum in either direction when the drum is disconnected from the drive.

6. In an apparatus of the kind described, a rotary drum having a discharge opening, a closure for said opening, drive means for said drum, manually-controlled means on the drum to turn the same independently of the drive, and clutch elements on the drive and on said manually-controlled means, in combination with a manually operable trip movable to a position to engage the closure while permitting the body of the drum to turn.

7. In an apparatus of the kind described, a rotary drum having a discharge opening, a closure for said opening, drive means for the drum, means for disconnecting the drum from its drive, manually controlled means for giving a limited turning movement to the drum in either direction independently of said drive when the latter is disconnected, a stationary deflecting track, a closure having a member normally movable past said deflecting track, and manually controlled trip movable to engage said member and direct it to the deflecting track.

8. In an apparatus of the kind described, a rotary hollow drum having on the interior longitudinally ranging ribs and intervening spaces, and heating elements ranging longitudinally of the drum beneath the said ribs.

In testimony whereof I have signed my name to this specification in the presence of two subscribing witnesses.

EVERETT T. SHORTT.

Witnesses:
A. THOREN,
J. L. HIZER.